(12) United States Patent
Fissette et al.

(10) Patent No.: US 7,966,952 B2
(45) Date of Patent: Jun. 28, 2011

(54) FOLDABLE TABLE FOR AIRCRAFT INTERIORS

(75) Inventors: Armand Fissette, Thousand Oaks, CA (US); Magnus Aspegren, Santa Monica, CA (US)

(73) Assignee: Embraer—Empresa Brasileira de Aeronáutica S.A., São José dos Campos-SP (BR)

( * ) Notice: Subject to any disclaimer, the term of this patent is extended or adjusted under 35 U.S.C. 154(b) by 841 days.

(21) Appl. No.: 11/923,469

(22) Filed: Oct. 24, 2007

(65) Prior Publication Data

US 2009/0107366 A1   Apr. 30, 2009

(51) Int. Cl.
  *A47B 5/00* (2006.01)
  *A47B 3/00* (2006.01)

(52) U.S. Cl. ............... 108/166; 108/115; 108/44

(58) Field of Classification Search ............ 108/33, 108/38, 39–41, 42, 44, 47, 48, 13, 17, 18, 108/59, 162, 166–175, 65, 67, 62, 90, 92, 108/93, 99–101, 115, 69–82
See application file for complete search history.

(56) References Cited

U.S. PATENT DOCUMENTS

| | | | | |
|---|---|---|---|---|
| 1,553,036 A | * | 9/1925 | Foss | 108/171 |
| 2,494,838 A | * | 1/1950 | Slaughter | 297/145 |
| 4,359,004 A | * | 11/1982 | Chappell | 108/44 |
| 4,818,017 A | * | 4/1989 | Dykstra et al. | 297/188.16 |
| D313,963 S | * | 1/1991 | Gunnarsson et al. | D12/419 |
| 5,547,247 A | * | 8/1996 | Dixon | 297/145 |
| 5,983,808 A | * | 11/1999 | Weil | 108/152 |
| 6,347,590 B1 | * | 2/2002 | D'Annunzio et al. | 108/44 |
| 6,793,281 B2 | * | 9/2004 | Duerr et al. | 297/147 |
| 7,108,226 B2 | * | 9/2006 | Quan et al. | 244/118.6 |
| 7,201,439 B2 | * | 4/2007 | Schweizer | 297/145 |
| D576,821 S | | 9/2008 | Fissette et al. | |
| 7,455,204 B2 | * | 11/2008 | Lippert et al. | 224/275 |
| 7,637,551 B2 | * | 12/2009 | Mahaffy | 296/24.34 |
| 2006/0016372 A1 | * | 1/2006 | Younse | 108/44 |
| 2006/0100764 A1 | * | 5/2006 | Adams et al. | 701/49 |
| 2006/0220425 A1 | * | 10/2006 | Becker et al. | 297/188.16 |
| 2006/0266779 A1 | * | 11/2006 | Mozer et al. | 224/543 |
| 2007/0145791 A1 | * | 6/2007 | Strasser | 297/162 |
| 2009/0078169 A1 | * | 3/2009 | Osborne et al. | 108/40 |
| 2009/0307843 A1 | * | 12/2009 | Hookway et al. | 5/425 |

\* cited by examiner

*Primary Examiner* — Darnell M Jayne
*Assistant Examiner* — Timothy M Ayres
(74) *Attorney, Agent, or Firm* — Nixon & Vanderhye P.C.

(57) ABSTRACT

An exemplary implementation of an aircraft interior table includes a base unit which includes a storage compartment having laterally projecting ends. A bi-fold table comprised of a table panels is horizontally stowed and supported on the upper surface of the base unit. Thus, in a stowed condition, one of the table panels is folded so as to be sandwiched between the other of the table panels and the upper surface of the base unit. The edge of the other table panel opposite to its hinged edge adjoining both table panels is pivotally connected to the base unit by means of a primary hinge. In use, the table panels may be rotated as a unit about the primary hinge so as to achieve an intermediate fold-out condition. While in such a position, the table will present itself half-sized so as to provide the associated aircraft seat occupant with minimal forward obstruction. From the intermediate fold-out condition, the other of the table panels may then be pivoted so that both table panels are positioned horizontally adjacent to one another. The fully deployed table panels will thus be supported in a cantilevered manner by the primary hinge attached to the base. Reversing such a procedure will fold the table panels and place them in a stowed condition.

7 Claims, 6 Drawing Sheets

FOLDABLE TABLE FOR AIRCRAFT INTERIORS

CROSS-REFERENCE TO RELATED APPLICATION

The subject matter disclosed herein is related to U.S. Design patent application No. 29/296,622 filed concurrently herewith, the entire content of which is expressly incorporated hereinto by reference.

TECHNOLOGICAL FIELD

The subject matter disclosed herein relates generally to the field of aircraft interiors, and specifically foldable (stowable) tables that may be employed in an aircraft interior environment.

BACKGROUND AND SUMMARY

It is desirable to provide aircraft passengers with a table for use during flight. However, due to applicable regulations, the table must be stowed during certain phases of the flight, for example during take-off and landings, so as to provide unobstructed egress from the passenger seats during an emergency.

In general aviation aircraft, the interiors may be uniquely customized to suit a particular customers desires. Aircraft interior tables are typically integrated vertically into a side ledge of the aircraft interior. In order to access such conventional tables, a cover member must typically be opened to then allow the hidden table to be pulled vertically from the side ledge so it may be lowered into position once fully exposed. The required movement to place the table into an operational mode therefore presents certain space constraints to the aircraft interior designer.

According to the implementations of the subject matter disclosed herein, however, aircraft interior tables are provided which enhance the available space within the aircraft.

An exemplary implementation of an aircraft interior table includes a base unit which includes a storage compartment having laterally projecting ends. A bi-fold table comprised of a table panels is horizontally stowed and supported on the upper surface of the base unit. Thus, in a stowed condition, one of the table panels is folded so as to be sandwiched between the other of the table panels and the upper surface of the base unit. The edge of the other table panel opposite to its hinged edge adjoining both table panels is pivotally connected to the base unit by means of a primary hinge.

In use, the table panels may be rotated as a unit about the primary hinge so as to achieve an intermediate fold-out condition. While in such a position, the table will present itself half-sized so as to provide the associated aircraft seat occupant with minimal forward obstruction. From the intermediate fold-out condition, the other of the table panels may then be pivoted so that both table panels are positioned horizontally adjacent to one another. The fully deployed table panels will thus be supported in a cantilevered manner by the primary hinge attached to the base. Reversing such a procedure will fold the table panels and place them in a stowed condition.

In certain embodiments, a foldable table for aircraft interiors is provided which comprises a base unit, and a bifold table having a pair of table panels hinged to one another and to the base unit. The table panels are thus hingedly movable between (i) a stowed condition wherein the table panels are supported on an upper surface of the base unit in such a manner that a distal one of the table panels is sandwiched between a proximal one of the table panels and the upper surface of the base unit, and (ii) a deployed condition wherein the proximal and distal table panels are disposed horizontally adjacent one another. The pair of table panels may also be hingedly moveable to an intermediate fold-out condition between the stowed and deployed conditions such that the proximal table panel is positioned horizontally adjacent the upper surface of the base unit and the distal table panel is adjacently stacked above the proximal table panel.

A primary hinge may provide a hinged connection between the proximal table panel and the base unit. Secondary hinges may provide a hinged connection between the proximal and distal table panels. In some embodiments, the primary hinge of the proximal table panel is hinged to the base unit at an edge of the proximal table panel which is opposite to an edge adjoining the proximal and distal table panels by the secondary hinges. The distal table panel may comprise a recessed region sized and configured to accommodate the primary hinge when the proximal and distal table panels are positioned one on top of the other.

In some implementations, the base unit may define an interior storage compartment which is covered by the bifold table when in the stowed condition. Additionally or alternatively, the base unit may comprise end regions which project laterally of the bifold table when in the stowed condition, in which case the end regions may comprise cup holders.

According to certain aspects, methods of providing a table surface in an aircraft interior are provided with comprise (a) mounting a foldable table to a side wall of an aircraft interior, the foldable table comprising a base unit, and a bifold table comprised of a pair of table panels hinged to one another and to the base unit, and (b) hingedly moving the bifold table between (i) a stowed condition wherein the table panels are supported on an upper surface of the base unit in such a manner that a distal one of the table panels is sandwiched between a proximal one of the table panels and the upper surface of the base unit, and (ii) a deployed condition wherein the proximal and distal table panels are disposed horizontally adjacent one another. The method may comprise hingedly moving the bifold table to an intermediate fold-out condition between the stowed and deployed conditions such that the proximal table panel is positioned horizontally adjacent the upper surface of the base unit and the distal table panel is adjacently stacked above the proximal table panel.

These and other features and advantages will be better and more completely understood by referring to the following detailed description of exemplary non-limiting illustrative implementations in conjunction with the drawings.

BRIEF DESCRIPTION OF THE DRAWINGS

An exemplary non-limiting illustrative implementation of the herein disclosed subject matter will be further explained by reference to the drawings of which.

DETAILED DESCRIPTION

The exemplary illustrative non-limiting implementations herein relate to foldable aircraft tables. As depicted in FIGS.

1 and 2, an exemplary implementation of an aircraft interior table 10 includes a base unit 12 which includes a storage compartment 14 having laterally projecting ends 14-1, 14-2. A bi-fold table 16 comprised of proximal and distal table panels 16-1 and 16-2, respectively, is horizontally stowed and supported on the upper surface 12-1 of the base unit 12.

Figure 1:
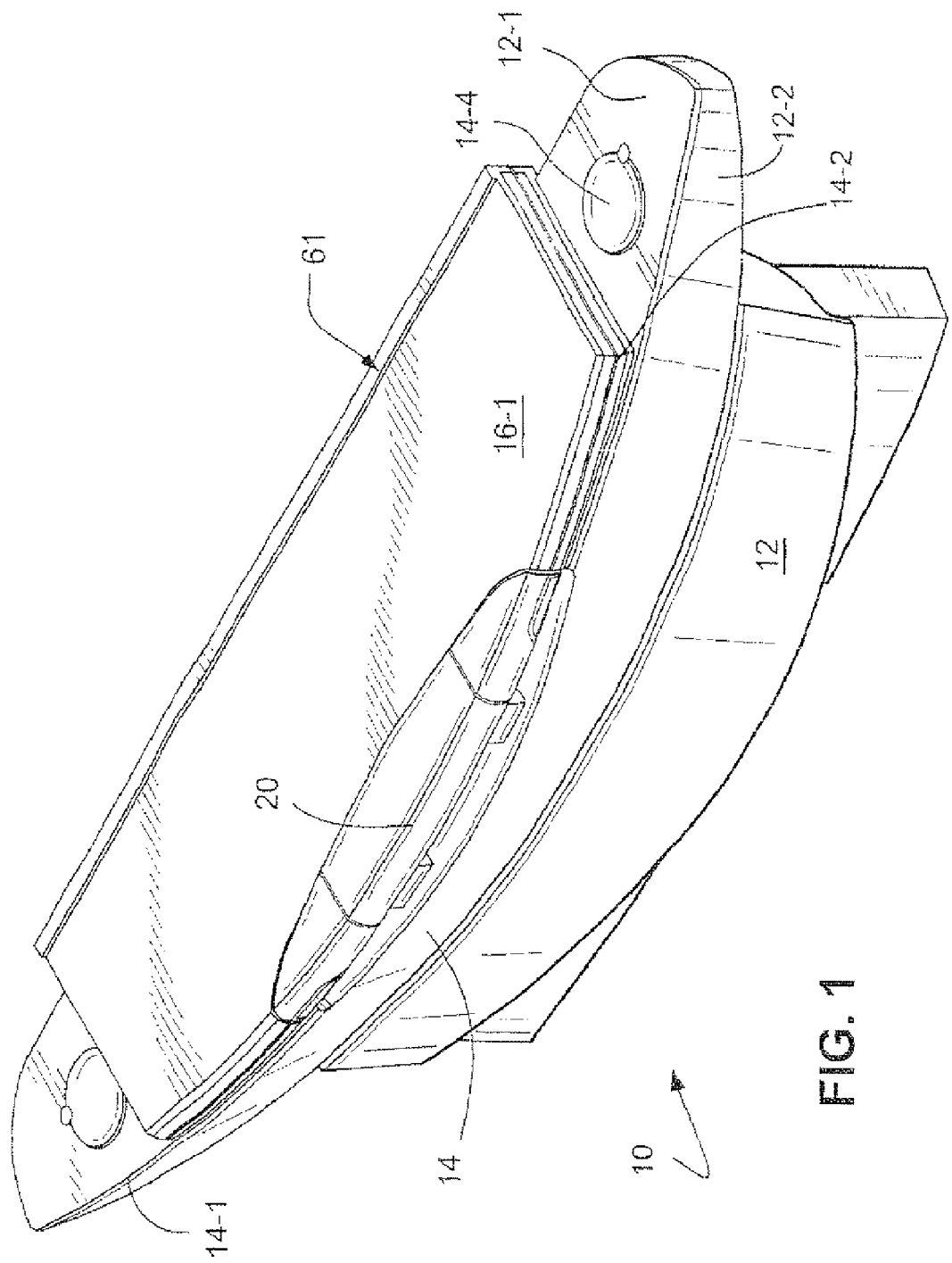
FIG. 1 is a front perspective view of an aircraft interior table in a stowed (folded) condition.
Figure 2:
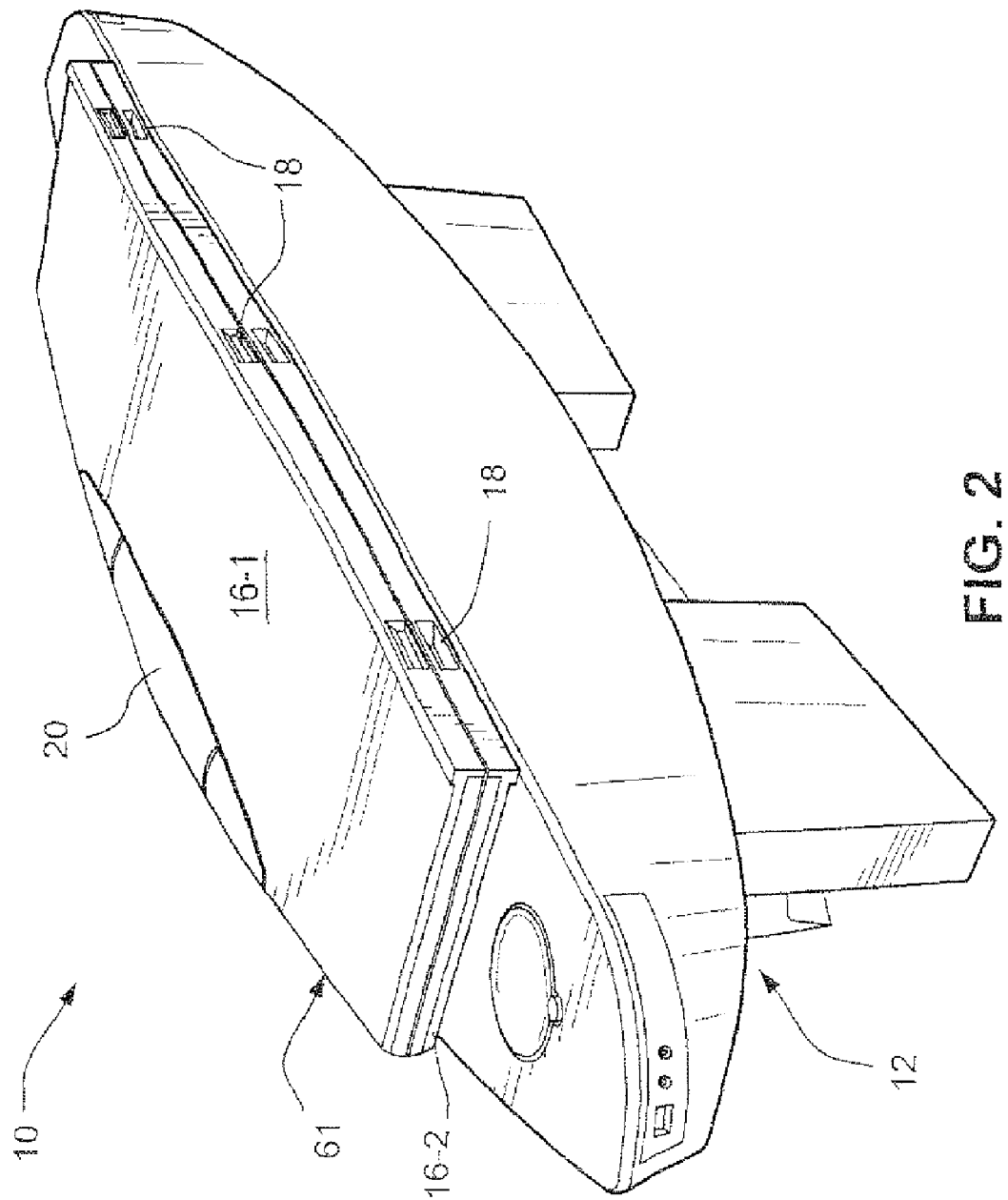
FIG. 2 is a rear perspective view of the aircraft interior table depicted in FIG. 1 in a stowed condition.

The table panels 16-1 and 16-2 are hinged to one another by secondary hinges 18 recessed into their respective adjoining edges (see FIG. 2). Thus, in a stowed condition, the distal table panel 16-2 is folded so as to be sandwiched between the proximal table panel 16-1 and the upper surface 12-1 of the base unit. The edge of the proximal table panel 16-1 opposite to its hinged edge adjoining the distal table panel 16-2 is pivotally connected to the base unit 12 by means of a primary hinge 20. In preferred forms, the primary hinge 20 is capable of allowing free rotation of the proximal table panel 16-1 through 180° and contains a bushing to allow for its smooth articulation. The structural components of the hinge 20 are preferably hidden by a decorative cover member as shown.

Figure 3:
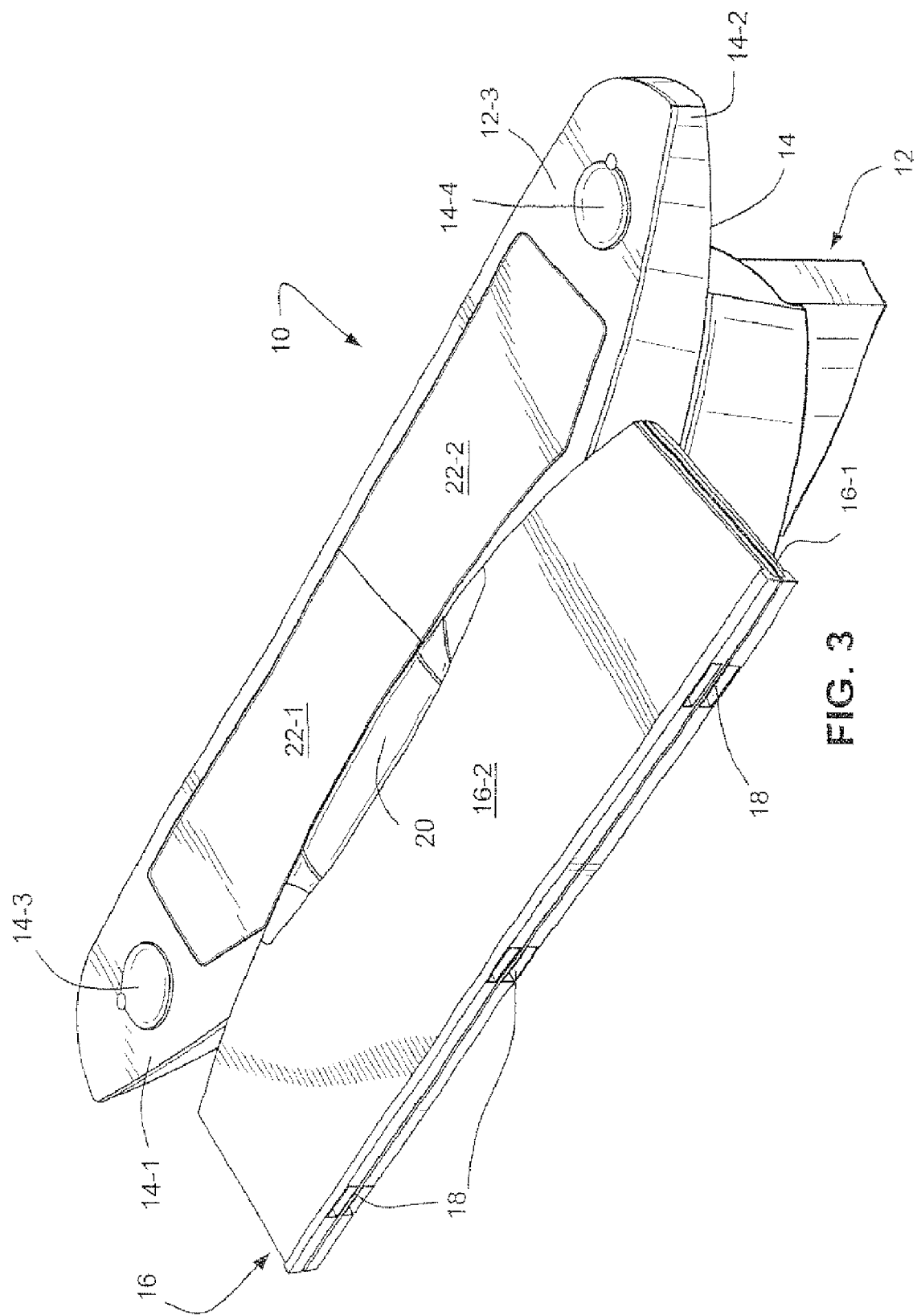
FIG. 3 is a top perspective view of the aircraft interior table depicted in FIG. 1 but shown in an intermediate fold-out condition.
Figure 4:
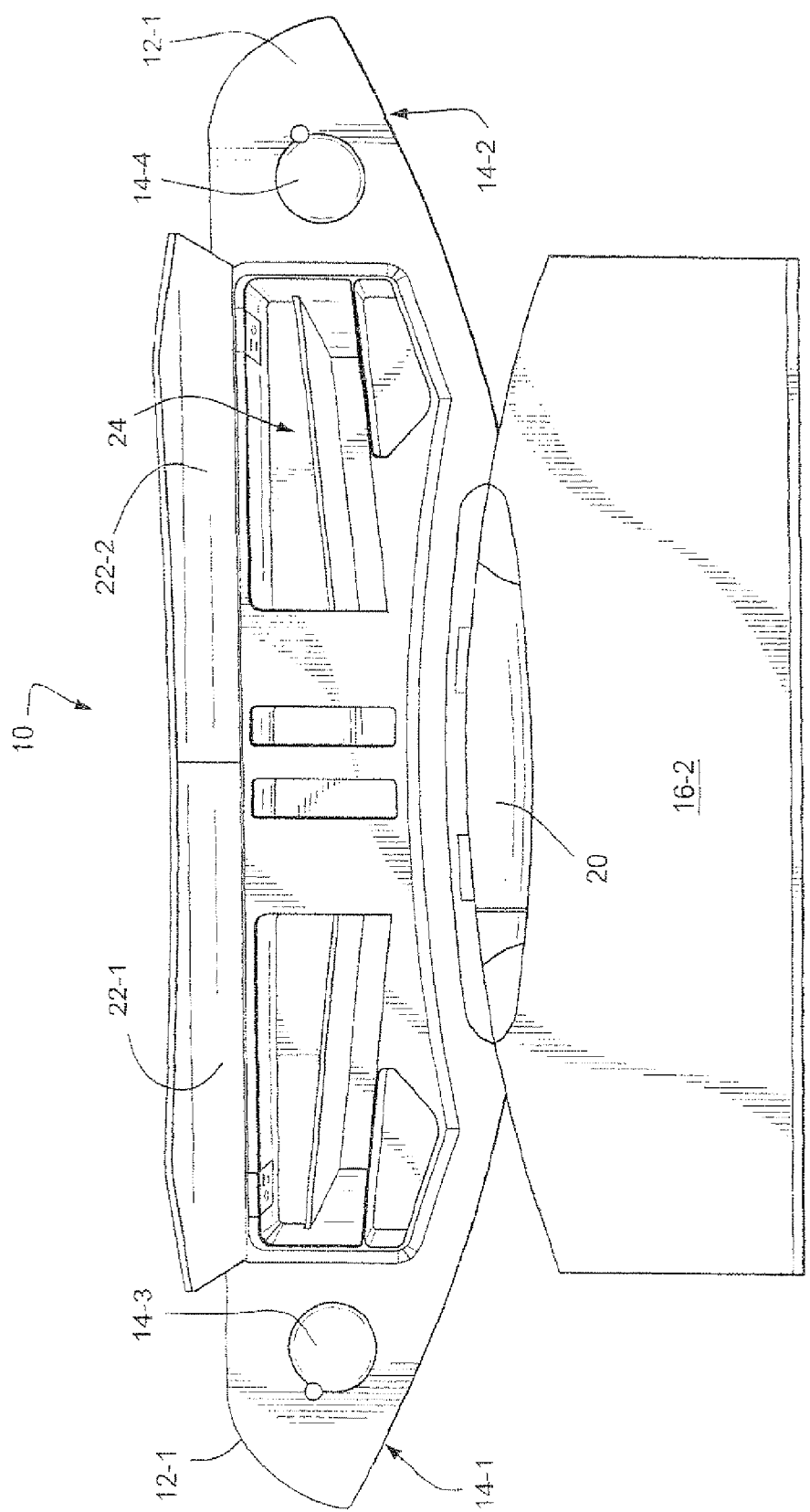
FIG. 4 is a top plan view of the aircraft interior table in an intermediate fold-out condition showing the storage access lids raised to thereby expose the internal storage compartment therebelow.

In use, the table panels 16-1, 16-2 may be rotated as a unit about the primary hinge 20 so as to achieve an intermediate fold-out condition as shown in FIGS. 3 and 4. While in such a position, the table 16 will present itself half-sized so as to provide the associated aircraft seat occupant with minimal forward obstruction. While in such a position, the storage compartment lids 22-1, 22-2 are then visible and may be raised to allow the aircraft seat occupant to access the storage space 24 within the base unit 12.

Figure 5:
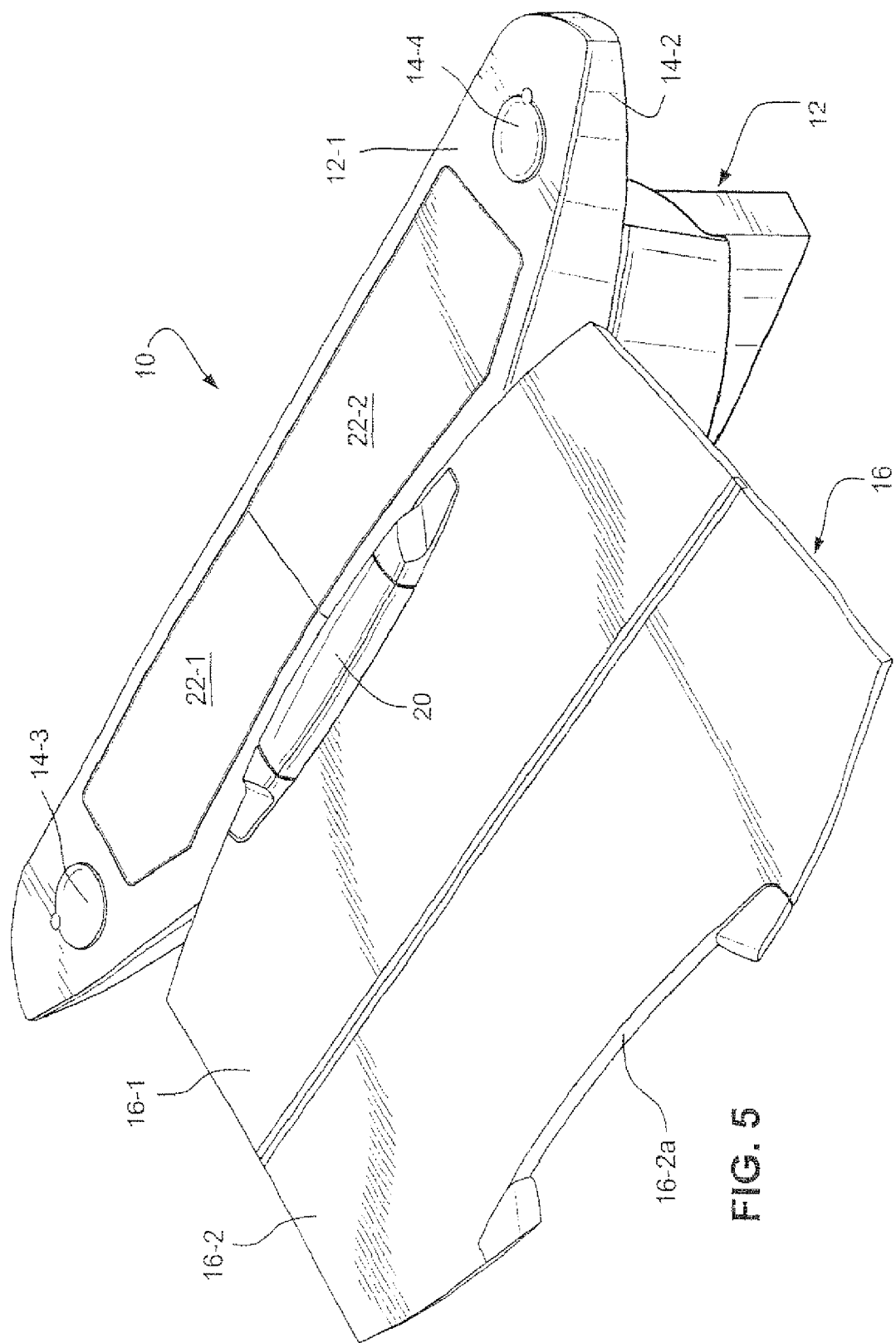
FIG. 5 is a top perspective view of the aircraft interior table depicted in FIG. 1 but shown in a full fold-out condition.
Figure 6:
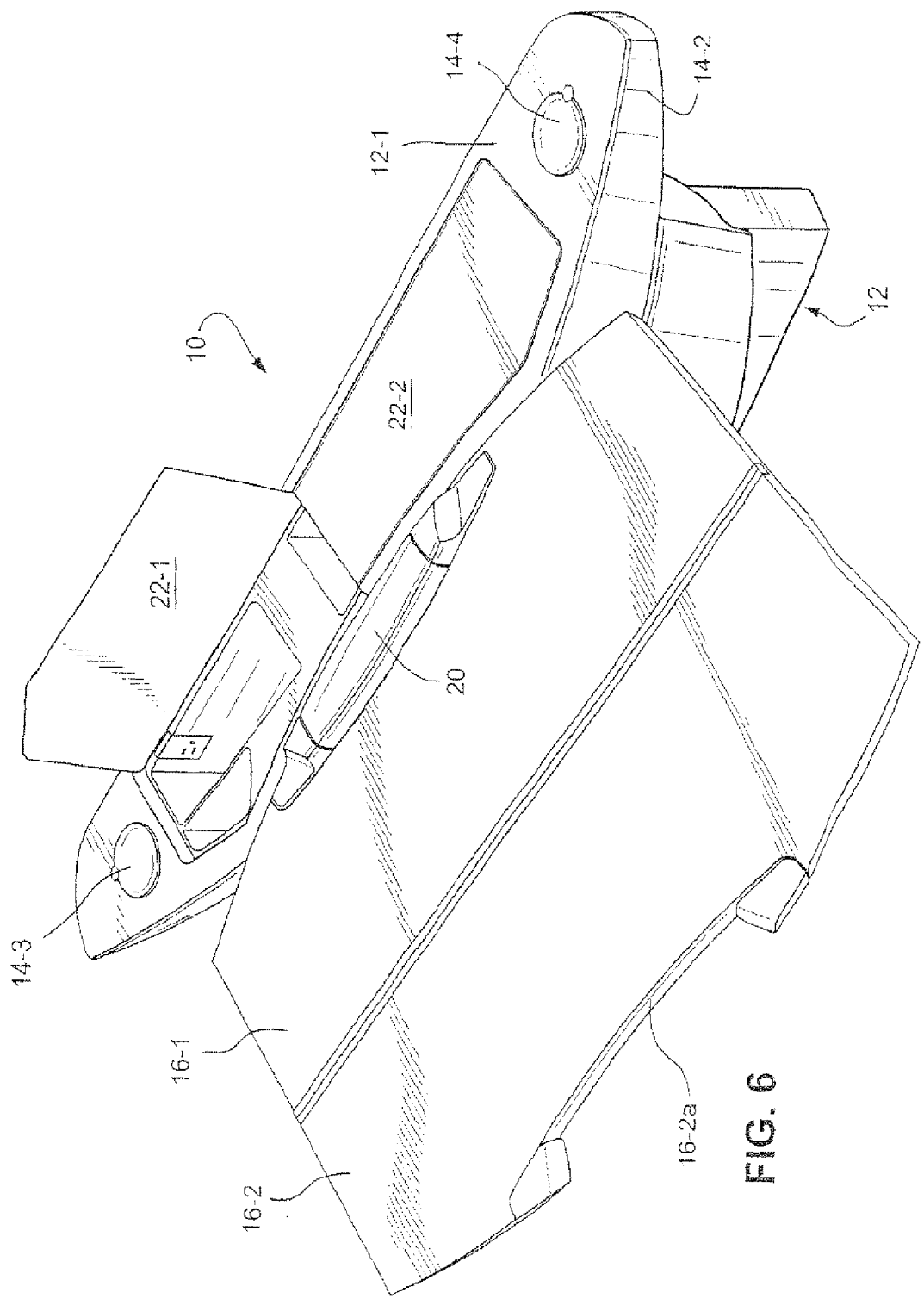
FIG. 6 is a front perspective view of the aircraft interior table depicted in FIG. 5 in a full told-out condition and also showing one of the storage access lids raised.

From the intermediate fold-out condition, the distal table panel 16-2 may then be pivoted relative to the proximal table panel 16-1 about the hinges 18 so that the latter is positioned horizontally adjacent to and outward of the former. Such a full fold-out condition of the table panels 16-1, 16-2 is depicted in FIGS. 5 and 6. It will be observed therein that the table 16 comprised of the proximal and distal table panels 16-1, 16-2, respectively, will be supported in a cantilevered manner by the primary hinge 20 attached to the base 12. As such, the primary hinge components must be designed so as to withstand substantial loads thereon, for example loads of up to about 140 pounds-force or more. The edge of the distal table panel 16-2 opposite to its hinged edge adjoining the proximal table panel 16-1 is provided with a recessed region 16-2a sized and configured to accommodate the decorative cover of the primary hinge 20 when the table panels 16-1, 16-2 are folded into a stacked arrangement with one another. (See FIGS. 3 and 4)

The laterally projecting ends 14-1, 14-2 of the storage compartment 14 are provided with fold-out cup holders 14-3, 14-4. When folded out, therefore, the cup-holders 14-3, 14-4 will effectively provide four usable holders for cups. The base 12 may also be provided with AC electrical outlets for passenger convenience, as well as switches to operate various passenger control units that may be employed in the particular aircraft interior configuration.

The base unit 12 of the foldable table 10 as described above may be attached physically to the aircraft interior sidewall as an independent unit thereby enhancing the available space within the aircraft. Moreover, since it is an independent unit, the table 10 may be mounted to the sidewall at virtually any position. The horizontal bi-fold stowage of the table panels 16-1, 16-2 allows for a lower mounting height within fuselage section as compared to traditional vertically stowed tables having a similar table size. Thus, the table 10 as described herein may be mounted at an optimum height to allow for passenger dining and/or working (e.g., as a laptop computer support surface).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A foldable table for aircraft interiors comprising:
   a base unit defining an upper supporting surface between front and rear edge regions thereof; and
   a bifold table comprised of proximal and distal table panels each having opposed forward and rearward edges;
   a primary hinge which connects the forward edge of the proximal table panel to the front edge region of the base unit;
   a secondary hinge which connects the rearward edge of the proximal table panel to the rearward edge of the distal table panel, wherein
   the primary and secondary hinges allow for the proximal and distal table panels to be hingedly movable relative to one another and to the base unit between (i) a stowed condition wherein the proximal and distal table panels are supported on the upper surface of the base unit in such a manner that the proximal and distal table panels are stacked one on top of the other with the distal table panel being sandwiched between the proximal table panel and the upper surface of the base unit with the opposed forward and rearward edge regions of the proximal and distal table panels being stacked over the front and rear edges of the base unit, respectively, and (ii) a deployed condition wherein the proximal and distal table panels are disposed horizontally adjacent one another in a cantilevered manner with the proximal table panel connected to the front edge region of the base unit by the primary hinge and the proximal and distal table panels connected to one another at the respective rearward edges thereof such that the proximal table panel is horizontally interposed between the distal table panel and the upper surface of the base unit.

2. A foldable table as in claim 1, wherein the pair of table panels are hingedly moveable to an intermediate fold-out condition between the stowed and deployed conditions such that the proximal table panel is positioned horizontally adjacent the upper surface of the base unit and the distal table panel is adjacently stacked above the proximal table panel.

3. A foldable table as in claim 1, further comprising multiple secondary hinges providing a hinged connection between the rearward edges of the proximal and distal table panels.

4. A foldable table as in claim 1, wherein the distal table panel comprises a recessed region defined in the forward edge thereof which is sized and configured to accommodate the primary hinge when the proximal and distal table panels are in the stowed condition thereof.

5. A foldable table as in claim 1, wherein the base unit comprises an interior storage compartment which is covered by the bifold table when in the stowed condition.

6. A foldable table as in claim 1, wherein the base unit comprises end regions which project laterally of the bifold table when in the stowed condition.

7. A foldable table as in claim 6, wherein the end regions of the base unit comprise cup holders.

* * * * *